United States Patent Office 3,294,673
Patented Dec. 27, 1966

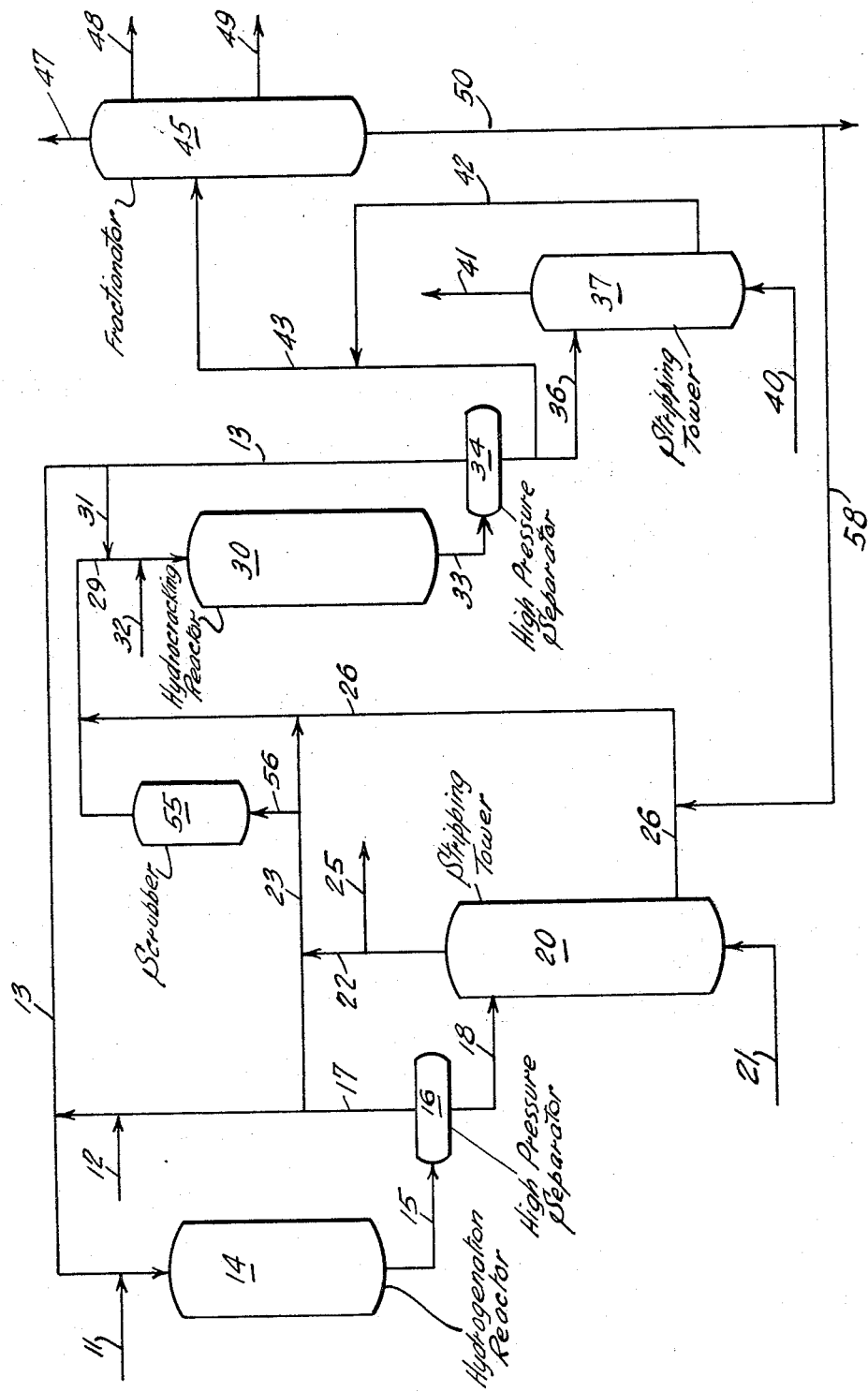

3,294,673
TREATMENT OF HYDROCARBONS
Reese A. Peck, Fishkill, N.Y., William F. Franz, Hopewell Junction, N.Y., and Donald A. Messing, Poughkeepsie, N.Y. (all of P.O. Box 509, Beacon, N.Y. 12508)
Filed Sept. 9, 1965, Ser. No. 490,767
15 Claims. (Cl. 208—89)

This application is a continuation-in-part of our co-pending application Serial No. 199,531, filed June 1, 1962, and now abandoned.

This invention relates to the treatment of hydrocarbons. More particularly, it is concerned with the conversion of heavy hydrocarbon liquids into lighter hydrocarbon liquids. In its more specific aspects, it relates to the hydroconversion or hydrocracking of hydrocarbon liquids boiling above about 400° F. into hydrocarobn liquids boiling below about 400° F.

Hydrocracking, that is the cracking particularly of petroleum hydrocarbons in the presence of hydrogen, is well known. The reaction may be carried out in the presence or nominal absence of a catalyst. Preferably, however, the reaction is conducted in the presence of a catalyst. Catalysts used in the hydrocracking of petroleum hydrocarbons are generally compositions comprising a hydrogenating component carried on a support. Suitable hydrogenating components comprise nickel, iron, tungsten, cobalt, palladium, platinum, molybdenum, chomium, vanadium, and mixtures thereof such as cobalt-molybdenum, cobalt-nickel-molybdenum, nickel-tungsten. The hydrogenating component may be in the form of the metal, the metal oxide or the metal sulfide. Particularly suitable components are nickel sulfide and cobalt sulfide.

The hydrogenating component generally is present in between about 0.1 and 40% by weight of the total catalyst composite. Supports such as natural cracking catalysts, synthetic silica alumina, synthetic silica magnesia, montmorillonite clay, zeolites, alumina gel and silica gel have been found satisfactory. Preferably however the support is acidic. If desired, the acidity of any support can be increased by treating it with an acid material such as HF. A high silica alumina support containing from 80 to 90% silica and 10 to 20% alumina by weight or a synthetic zeolite is particularly suitable.

Hydrocracking is generally designed and carried out to produce a hydrocarbon fraction boiling below about 400° F. which may be used as produced as a component for motor fuel or may be further treated to yield high octane components. It is therefore desirable to carry out the hydrocarcking reaction under conditions to yield relatively high amounts of high octane components in the reaction product. For this reason it has been found advantageous to conduct the hydrocracking reaction at temperatures as low as possible consistent with adequate conversion. Accordingly, although the hydrocracking reaction may be carried out at temperatures ranging from about 400 to 800° F. or higher, advantageously the reaction is carried out at a temperature not greater than about 700° F. to improve the yield of isoparaffins.

Hydrocracking, as the name implies, is carried out in the presence of added hydrogen. The hydrogen need not be pure and satisfactory results have been obtained using gases containing at least 60 volume percent hydrogen. In the present specification and claims, the term hydrogen is intended to include dilute hydrogen. Hydrogen rates may range from 1,000 to 20,000 s.c.f. (standard cubic feet)/bbl. of feed. However, hydrogen rates of from 5,000 to 15,000 s.c.f./bbl. are preferred. The pressure in the hydrocracking zone should be maintained at at least 200 p.s.i.g., preferably between about 500 and 3,000 p.s.i.g. The liquid hourly space velocity may range from 0.1 to 10 volumes of hydrocarbon per volume of catalyst per hour (v./v./hr.). Preferred rates are from 0.2 to 5.

As is the case with almost any catalyst which is used in carrying out reactions involving hydrocarbons at elevated temperatures, the hydrocracking catalysts are subjected to loss of activity. Generally this can be accounted for by the deposition of carbon on the catalyst due to hydrocarbon decomposition. Activity which has been lost due to the deposition of coke or carbon on the catalyst can be recovered by regenerating the catalyst and this is accomplished by burning off the carbon at a controlled rate and temperature using a gas containing a regulated amount of oxygen.

In addition to the loss of activity due to carbon deposition, the preferred hydrocracking catalyst are subjected to loss of activity due to nitrogen poisoning. Apparently the preferred hydrocracking catalysts are acidic in nature and the basic nitrogen present in the feed tends to neutralize to some extent the acidic nature of the catalyst. Although activity lost by nitrogen contact or by the deposition of carbon can be restored, loss of activity of the catalyst by contact with nitrogen compounds occurs at a much faster rate than by the deposition of carbon and, to prolong on-stream periods, it has been found advantageous to remove nitrogen compounds from the feed. This is accomplished by subjecting the feed to a pretreatment which comprises contacting the feed with a hydrogenation catalyst in the presence of hydrogen under conditions to convert the nitrogen present to ammonia.

Suitable hydrogenation catalysts for the conversion of the nitrogen in the feed to ammonia comprise the metals of Group VI or Group VIII of the Periodic Table or their oxides or sulfides. Catalysts such as the oxides of cobalt, molybdenum, nickel and tungsten have been found satisfactory. Particularly suitable are the oxides of cobalt and molybdenum, nickel and molybdenum, and the sulfides of nickel and tungsten. Preferably the catalyst is supported on a material such as alumina, silica, magnesia or mixtures thereof. The hydrogenation reaction may be carried out at a temperature between about 400 and 850° F., a pressure between about 500 and 2,000 p.s.i.g., a liquid hourly space velocity of from 0.5 to about 20 volumes of liquid feed per hour per volume of catalyst in the presence of between 200 and 10,000 standard cubic feet of hydrogen per barrel of feed. Preferred operating conditions are 500–780° F., 1–5 v./v./hr., 500–1,500 p.s.i.g. and 500 to 4,000 s.c.f. $H_2$/bbl. The nitrgen-free feed, that is containing not more than 25 p.p.m. nitrogen and preferably less than 10 p.p.m. nitrogen, is then contacted with the hydrocracking catalyst under hydrocracking conditions. To prevent contamination or poisoning of the catalyst it has been customary to supply fresh nitrogen-free hydrogen to the hydrocracking zone. Although this hydrogen is substantially pure and thus avoids deactivation of the catalyst by nitrogen poisoning it increases the cost of the operation.

Now it has been found that it is not necessary to supply fresh hydrogen to the hydrocracking zone. In fact, it has been found that hydrogen used in the hydrogenation of a typical nitrogen- and sulfur-containing charge stock, after being treated for the removal of ammonia, is actually more suitable and desirable for use in the hydrocracking reaction than is fresh hydrogen.

According to the present invention a nitrogen- and sulfur-containing hydrocarbon liquid boiling above about 400° F. is first contacted with a hydrogenation catalyst under hydrogenation conditions. The effluent from the hydrogenation zone is separated into a normally gaseous portion and a normally liquid portion. The normally gaseous portion is scrubbed to remove ammonia therefrom and the scrubbed portion is then combined with the normally liquid portion and the combined stream is passed into contact with a hydrocracking catalyst under hydrocracking conditions. By the use in the hydrocracking zone of scrubbed hydrogen from the hydrogenation zone the activity of the hydrocracking catalyst is prolonged far beyond the period of activity obtained when either unscrubbed gas from the hydrogenation zone is used or even when fresh substantially pure nitrogen-free hydrogen is used.

The normally gaseous portion of the hydrogenation zone effluent may be scrubbed with any material that is capable of removing the ammonia from the gas stream either by solution or neutralization. Suitable liquids are water and acids such as sulfuric acid.

For a better understanding of the invention, reference is now made to the accompanying drawing which shows diagrammatically a flow scheme for the practice of the present invention and in connection with which the following examples are described.

*Example I*

A light cycle gas oil having the following characteristics:

| | |
|---|---|
| Gravity, ° API | 28.6 |
| Sulfur, wt. percent | 0.48 |
| FIA, vol. percent: | |
|    Aromatics | 42.5 |
|    Olefins | 3.5 |
|    Saturates | 54.0 |
| Nitrogen, p.p.m. | 75 |
| ASTM dist., ° F.: | |
|    IBP–5% | 460–480 |
|    10–20% | 486–498 |
|    30–40% | 508–518 |
|    50–60% | 528–538 |
|    70–80% | 548–564 |
|    90–95% | 584–600 |
|    EP. (percent OH) | 612(98) | is introduced into the system through line 11 and with recycle hydrogen, amounting to 5,000 s.c.f./bbl. of feed, from line 13 is introduced into hydrogenation reactor 14 which is maintained at a temperature of 700° F. and a pressure of 1100 p.s.i.g. In hydrogenation reactor 14, the feed is contacted with a catalyst containing 3.1% NiO and 15% $MoO_3$ supported on alumina at a space velocity of 2.0 v./v./hr. (volumes of feed per volume of catalyst per hour). The reaction product is then passed through line 15 to high pressure separator 16 from which a gas rich in hydrogen is removed through line 17 and a liquid portion is removed through line 18 and introduced into stripping tower 20 where it is countercurrently contacted with a stream of make-up hydrogen introduced through line 21 at a rate of 900 s.c.f./bbl. of original feed. Gases removed through line 22 are combined with hydrogen from high pressure separator 16 in line 23 and the mixed stream together with bottoms from stripping tower 20 removed therefrom through line 26 are introduced into hydrocracking reactor 30 through line 29. The combined gaseous stream in line 23 amounts to 5500 s.c.f./bbl. of original feed and this is augmented with 4500 s.c.f./bbl. recycle hydrogen from line 31. The reaction mixture containing 184 p.p.m. nitrogen passes through hydrocracking reactor 30 which is maintained at about 1100 p.s.i.g. at a velocity of 1.0 v./v./hr. and at varying temperatures which are tabulated below. Hydrocracking reactor 30 contains a catalysts having the following composition: CoS 6.1%, $AlF_3$ 4.4%, $Al_2O_3$ 9.5% and $SiO_2$ 80.0%. Effluent from hydrocracking reactor 30 is transferred by means of line 33 to high pressure separator 34 from which 9500 s.c.f. $H_2$/bbl. of original feed is removed through line 13 and is apportioned as described above. Bottoms from high pressure separator are transferred through line 36 to stripping tower 37 wherein they are contacted with steam introduced through line 40. Stripped gases are removed from the system through line 41 and the stripped liquid is sent through lines 42 and 43 to fractionator 45 where it is separated into a fraction boiling up to about 200° F. removed through line 47, a 200–400° F. fraction removed through line 48, a 400–550° F. fraction removed through line 49, and a 550+ ° F. fraction removed through line 50.

*Example II*

In this example, a feed as used in Example I is combined with 5400 s.c.f./bbl. of hydrogen from line 13, 5000 s.c.f. being from high pressure separator 16 via line 17 and 400 s.c.f. being make-up hydrogen from line 12. The reaction mixture is introduced into hydrogenation reactor 14 which is maintained at substantially the same reaction conditions as in Example I. The reaction products pass through line 15 to high pressure separator 16 from which recycle gas is removed through line 17 for recycle to hydrogenation reactor 14 through line 13 and liquid bottoms are transferred through line 18 to stripping tower 20. An inert stripping gas is introduced through line 21 to remove entrained and dissolved gaseous materials from the liquid. Stripped gases are removed through line 22 and exhausted from the system through line 25. Liquid hydrogenated product passes through lines 26 and 29 and with 9000 s.c.f./bbl. of recycle hydrogen from line 31 and 1000 s.c.f./bbl. of nitrogen-free make-up hydrogen from line 32 is introduced into hydrocracking reactor 30 at a liquid hourly space velocity of 1.0 v./v./hr. The feed to hydrocracking reactor 30 has a nitrogen content of 1 p.p.m. The pressure in hydrocracking reactor 30 is maintained at approximately 1100 p.s.i.g. and the temperature is controlled to effect a 43 volume percent conversion to products boiling below about 400° F. Effluent from hydrocracking reactor 30 passes through line 33 to high pressure separator 34 from which a recycle gas is separated and returned to hydrocracking reactor 30 through lines 13, 31 and 29. Liquid product from high pressure separator 34 passes directly to fractionator 45 through lines 36 and 43 and is fractionated as in Example I.

*Example III*

In this example, the same feed as that used in Examples I and II is introduced into the system through line 11 and with 5000 s.c.f./bbl. of recycle gas from line 13 is introduced into hydrogenation reactor 14 under substantially the same conditions used in Examples I and II. Effluent from hydrogenation reactor 14 passes through line 15 to high pressure separator 16 from which a gas rich in hydrogen amounting to about 4600 s.c.f./bbl. of feed is removed through line 17. The liquid from high pressure separator 16 is introduced by means of line 18 into stripping tower 20 where it is contacted with 1100 s.c.f./ bbl. make-up hydrogen introduced through line 21. Gaseous effluent from stripping tower 20 is removed through line 22 and is combined in line 23 with gaseous effluent removed from high pressure separator 16 through line 17. The comibned gas stream which amounts to 5500 s.c.f./ bbl. of original feed is then introduced through line 56 into scrubber 55 where it is contacted with sulfuric acid. The scrubbed gaseous stream is removed through line 29 and combined with stripped liquid product from line 26 plus about 4500 s.c.f./bbl. recycle hydrogen from line 31. This reaction mixture which contains 1 p.p.m. nitrogen passes through hydrocracking reactor 30 at a liquid hourly space velocity of 1.0 v./v./hr. The pressure in hydrocracking reactor 30 is maintained at 1100 p.s.i.g. and the temperature is regulated to effect a 43 volume percent conversion to hydrocarbons boiling below about 400° F. The hydrocarcking reaction product passes through line 33 to high pressure separator 34 from which recycle gas is removed through line 13, 4500 s.c.f. being sent to hydrocracking reactor 30 through line 31 and 29 and 5000 s.c.f./bbl. being recycled to hydrogenation reactor 14 through line 13. Bottoms from high pressure separator 34 are sent through line 36 into stripping tower 37 where steam introduced through line 40 effects the removal of entrained and dissolved gases. The scrubbed liquid then passes through lines 42 and 43 to fractionator 45 where it is separated into various fractions as disclosed above. If desired, heavy product boiling above 550° F. may be recycled from fractionator 45 to hydrocracking reactor 30 through lines 50, 58, 26 and 29.

The above comparative runs determine the life and activity of the hydrocarcking catalyst where (1) hydrogen from the hydrogenation reactor is used for the hydrocracking reaction (2) separate hydrogen streams are used for the hydrogenation and for the hydrocracking and (3) acid scrubbed hydrogen from the hydrogenation reaction is used for the hydrocracking.

Tabulated below are the conditions necessary to maintain a 43 volume percent conversion of products boiling below about 400° F.

|  | I | II | III |
|---|---|---|---|
| Operating Conditions: |  |  |  |
| Pressure, p.s.i.g. | 1,100 | 1,100 | 1,100 |
| LHSV, v./hr./v. | 1.0 | 1.0 | 1.0 |
| Hydrogen Rate, s.c.f.b. | 10,000 | 10,000 | 10,000 |
| After 20 hours: |  |  |  |
| Temperature, °F. | 586 | 575 | 530 |
| $C_5$ Iso/Normal Ratio | 9.4 | 8.0 | 8.7 |
| After 100 hours: |  |  |  |
| Temperature, °F. | 776 | 600 | 540 |
| $C_5$ Iso/Normal Ratio | 5.4 | 6.0 | 8.7 |
| After 200 hours: |  |  |  |
| Temperature, °F. |  | 600 | 550 |
| $C_5$ Iso/Normal Ratio |  | 6.0 | 8.4 |
| After 400 hours: |  |  |  |
| Temperature, °F. |  | 605 | 570 |
| $C_5$ Iso/Normal Ratio |  | 5 8 | 8.1 |
| Hydrogen Consumption, s.c.f./bbl. | 500 | 600 | 700 |

It will be noted from Examples II and III that, although the hydrocracking feed in each case contains only 1 p.p.m. nitrogen, the hydrocracking catalyst has superior life and activity when the hydrogen stream used for the hydrogenation is then used for the hydrocracking.

*Example IV*

This example shows the criticality of the $H_2S$ content of the hydrogenating gas of the second stage. The feed stock has the following properties:

Gravity, °API _____ 28.0
Sulfur, wt. percent _____ 0.3
Nitrogen, p.p.m. _____ 500
ASTM dist., °F.:
   IBP–5% _____ 460–478
   10–20% _____ 485–500
   30–40% _____ 506–514
   50–60% _____ 525–535
   70–80% _____ 546–565
   90–95% _____ 580–592
   E.P. (percent OH) _____ 606(98)

Using the same processing conditions as Example III, but in Run A using 10 pounds of water per barrel of charge for scrubbing purposes and in Run B using 1500 pounds of water per barrel of charge, the following conditions are required to maintain a 43 volume percent conversion to products boiling below 400° F.

|  | A | B |
|---|---|---|
| Operating Conditions: |  |  |
| Pressure, p.s.i.g. | 1,100 | 1,100 |
| LHSV v./hr./v. | 1.0 | 1.0 |
| Hydrogen rate, s.c.f.b. | 10,000 | 10,000 |
| After 20 hours: Temperature, °F. | 535 | 560 |
| After 100 hours: |  |  |
| Temperature, °F. | 540 | 590 |
| $C_5$ Iso/Normal ratio | 8.8 | 5.9 |
| After 200 hours: |  |  |
| Temperature, °F. | 545 | 605 |
| $C_5$ Iso/Normal ratio | 8.5 | 5.8 |
| After 400 hours: |  |  |
| Temperature, °F. | 560 | 625 |
| $C_5$ Iso/Normal ratio | 8.2 | 5.7 |

The difference in activity is attributed to the different amounts of water used. In Run A, only sufficient water is used to dissolve the ammonia in the hydrogen leaving approximately 1 pound of $H_2S$ per 5000 s.c.f. of hydrogenating gas whereas in Run B, sufficient water is used to remove all of the ammonia and $H_2S$ so that the hydrogenating gas contains only 1 p.p.m. nitrogen and less than 0.001% sulfur.

We claim:
1. A process for the conversion of a sulfur and nitrogen-containing hydrocarbon liquid into a lighter hydrocarbon liquid which comprises contacting a sulfur and nitrogen-containing hydrocarbon liquid charge stock with a hydrogenation catalyst under conditions to convert the sulfur contained therein to hydrogen sulfide and the nitrogen contained therein to ammonia, separating the hydrogenation zone effluent into a normally gaseous portion and a normally liquid portion, removing ammonia from the normally gaseous portion while permitting the hydrogen sulfide to remain therein, combining said normally liquid portion with the substantially nitrogen-free normally gaseous portion and passing the combined stream into contact with a hydrocracking catalyst under hydrocracking conditions.

2. The process of claim 1 in which the normally gaseous portion is contacted with a liquid having an affinity for ammonia.

3. The process of claim 1 in which the hydrocracking-catalyst comprises nickel sulfide.

4. The process of claim 1 in which the hydrocracking catalyst comprises cobalt sulfide.

5. The process of claim 1 in which the hydrocarbon liquid charge stock contains sulfur and in which the ammonia is removed by contacting the normally gaseous portion with an acid medium.

6. A process for the conversion of a sulfur and nitrogen-containing hydrocarbon liquid into a lighter hydrocarbon liquid which comprises contacting a sulfur and nitrogen-containing hydrocarbon liquid charge stock with a hydrogenation catalyst at a temperature between about 400 and 850° F., a pressure between about 50 and 1500 p.s.i.g. and a space velocity between 0.5 and 20 volumes of normally liquid feed per volume of catalyst per hour in the presence of between about 200 and 6000 standard cubic feet of hydrogen per barrel of liquid feed to convert nitrogen contained therein to ammonia and sulfur to hydrogen sulfide, separating the effluent from the hydrogenation zone into a normally liquid portion and a normally gaseous portion, scrubbing said normally gaseous portion with a liquid having an affinity for ammonia to effect removal of the ammonia contained therein while permitting the hydrogen sulfide to remain therein, combining the scrubbed normally gaseous portion with the normally liquid portion and passing the combined stream into contact with a hydrocracking catalyst at a temperature between about 300 and 850° F., a pressure between about 300 and 5,000 p.s.i.g. at a space velocity between 0.1 and 10 volumes of liquid feed per volume of catalyst per hour in the presence of between about 1000 and 20,000 standard cubic feet of hydrogen per barrel of normally liquid feed and recovering the desired lighter hydrocarbon liquid from the effluent from the hydrocracking zone.

7. The process of claim 6 in which the scrubbing liquid comprises sulfuric acid.

8. In a process in which a substantially nitrogen-free hydrocarbon liquid is converted into a lighter hydrocarbon liquid by contacting a substantially nitrogen-free hydrocarbon liquid charge stock with a hydrocracking catalyst under hydrocracking conditions, the improved method of prolonging the life of the hydrocracking catalyst which comprises contacting a sulfur and nitrogen-containing hydrocarbon liquid charge stock with a hydrogenation catalyst at a temperature between about 400 and 850° F., a pressure between about 50 and 1500 p.s.i.g., a liquid hourly space velocity between about 0.5 and 20 in the presence of between 200 and 6,000 standard cubic feet of hydrogen per barrel of normally liquid feed to convert the nitrogen in said hydrocarbon liquid charge stock to ammonia and the sulfur to hydrogen sulfide, separating the effluent from the hydrogenation zone into a normally liquid portion and a normally gaseous portion containing ammonia and hydrogen sulfide, removing the ammonia from said normally gaseous portion by contacting the normally gaseous portion with a liquid having an affinity for ammonia while permitting hydrogen sulfide to remain therein, combining the so-treated normally gaseous portion with said normally liquid portion and contacting the combined stream with a hydrocracking catalyst at a temperature between about 300 and 850° F., a pressure between 300 and 5,000 p.s.i.g., a liquid hourly space velocity between 0.1 and 10 in the presence of between 5,000 and 15,000 standard cubic feet of hydrogen per barrel of normally liquid feed to the hydrogen per barrel of normally liquid feed to to the hydrogenation zone and recovering a substantially nitrogen-free hydrocarbon liquid from the hydrocracking zone effluent.

9. The process of claim 8 in which the normally liquid portion is contacted with a gaseous stream to effect removal of ammonia present in the liquid.

10. The process of claim 9 in which the gaseous stream comprises hydrogen.

11. The process of claim 8 in which the hydrocracking catalyst comprises nickel sulfide.

12. The process of claim 8 in which the hydrocracking catalyst comprises cobalt sulfide.

13. In a process in which a substantially nitrogen-free hydrocarbon liquid is converted into a lighter hydrocarbon liquid by contacting the substantially nitrogen-free hydrocarbon liquid charge stock with a hydrocracking catalyst under hydrocracking conditions, the improved method of prolonging the life of the hydrocracking catalyst which comprises contacting a sulfur and nitrogen-containing hydrocarbon liquid charge stock with a hydrogenation catalyst at a temperature between about 500 and 780° F., a pressure between about 500 and 1500 p.s.i.g., a liquid hourly space velocity between about 1 and 5 in the presence of between 500 and 4000 s.c.f. hydrogen per bbl. of normally liquid feed to convert the nitrogen in said hydrocarbon liquid charge to ammonia and the sulfur to hydrogen sulfide, separating the effluent from the hydrogenation zone into a normally liquid portion and a normally gaseous portion containing ammonia and hydrogen sulfide, removing the ammonia from said normally gaseous portion by contacting the normally gaseous portion with a liquid having an affinity for ammonia while permitting hydrogen sulfide to remain therein, countercurrently contacting the normally liquid portion with an inert gas, combining the treated normally gaseous portion with the treated normally liquid portion and contacting the combined stream with a hydrocracking catalyst at the temperature between about 400 and 700° F., a pressure between about 500 and 1500 p.s.i.g., a liquid hourly space velocity between about 0.2 and 5 v./v./hr. in the presence of between about 5000 and 15,000 s.c.f. hydrogen per bbl. of normally liquid feed to the hydrogenation zone and recovering a substantially nitrogen-free hydrocarbon liquid from the hydrocracking zone effluent.

14. The process of claim 13 in which the hydrogenation catalyst comprises nickel and molybdenum, the hydrocracking catalyst comprises nickel oxide on a silica-alumina base and the treated normally liquid portion boils above about 400° F.

15. The process of claim 13 in which the hydrogenation catalyst comprises nickel and molybdenum, the hydrocracking catalyst comprises nickel-tungsten sulfide on a silicia-alumina base and the treated normally liquid portion boils above about 400° F.

References Cited by the Examiner

UNITED STATES PATENTS

| | | | |
|---|---|---|---|
| 2,911,352 | 11/1959 | Goretta et al. | 208—89 |
| 3,006,843 | 10/1961 | Archibald | 208—212 |
| 3,023,158 | 2/1962 | Watkins | 208—89 |
| 3,132,089 | 5/1964 | Hass et al. | 208—89 |
| 3,132,090 | 5/1964 | Helfrey et al. | 208—89 |
| 3,147,210 | 9/1964 | Hass et al. | 208—210 |

DELBERT E. GANTZ, *Primary Examiner.*

SAMUEL P. JONES, *Assistant Examiner.*